Inventor:
Gerhard Müller
by Michael J. Striker
his Attorney

Inventor:
Gerhard Müller
Michael S. Striker
by
his Attorney

United States Patent Office 3,632,706
Patented Jan. 4, 1972

3,632,706
METHOD OF PRODUCING RECTANGULAR CROSS-SECTIONAL-POLYURETHANE FOAM MATERIAL
Gerhard Müller, Memmingen, Germany, assignor to Metzeler AG, Munich, Germany
Filed Aug. 20, 1968, Ser. No. 826,030
Claims priority, application Germany, Aug. 22, 1967,
P 17 04 847.4
Int. Cl. B29d 27/04
U.S. Cl. 264—51
9 Claims

ABSTRACT OF THE DISCLOSURE

A slab of rectangular cross-sectional outline is obtained by feeding several streams of free-rising foam into a confining path defined by a travelling bottom liner of release paper and two lateral liners of release paper. A first stream is admitted onto the bottom liner and additional streams are admitted against the inner sides of the lateral liners. The three streams form a U-shaped mass which is advanced through a foaming zone where the material of the mass foams and forms a flat-top slab.

The points of admission of lateral streams can be in registry with, upstream or downstream of the point of admission of the bottom stream, and the points where the lateral streams are admitted can be located at, below or above the level of the top surface of the slab.

CROSS-REFERENCE TO RELATED APPLICATION

The present method constitutes an improvement over and a further development of methods disclosed in the copending application Ser. No. 745,267, filed July 16, 1968 by Darmochwal et al., for Method and Apparatus for the Production of Foamed Slabs of Rectangular Cross Section and assigned to the same assignee.

BACKGROUND OF THE INVENTION

The present invention relates to a method for the production of foam material, and more particularly to a method of producing slabs consisting of flexible urethane stock or analogous synthetic plastic material. Still more particularly, the invention relates to continuous production of slabs which are obtained in response to foaming of free-rising foam which travels lengthwise within the confines of a conveyor provided with liners of release paper or like flexible material to form a slab having a flat top.

German Pat. No. 1,207,072 discloses a stationary mold which accommodates a travelling flexible liner of release paper serving to advance a loaf of free-rising foam lengthwise through a foaming zone wherein the material rises to form a slab. The travelling liner coats the bottom wall of the trough. Two lateral liners are provided along the inner sides of the side walls of the trough and each of these lateral liners is caused to perform a composite movement including a horizontal movement in the direction of travel of the bottom liner and an upward movement. Such composite movement of lateral liners is intended to insure that the sides of the loaf rise at the same rate as the central portion of the loaf so that the resulting slab does not exhibit a pronounced ridge or crest. The lower edge portions of the lateral liners are caused to overlie a substantially runner-like guide plate which extends from the point where the loaf begins to rise. The speed of horizontal movement of lateral liners equals or approximates the forward speed of the bottom liner and the speed of their upward movement matches or even exceeds the speed at which the loaf rises during travel through the foaming zone. This is intended to reduce friction between the loaf and the lateral liners and to thus insure free rise of the loaf and the formation of a flat-top slab.

A drawback of the just described process is that the speed of lateral liners must be controlled with a high degree of precision and that the foaming zone must be supervised at all times in order to insure that the speed of vertical movement of each lateral liner corresponds to the rate at which the loaf rises in the foaming zone. The problem is the same in certain other types of conventional apparatus wherein the lateral liners are replaced by revolving disks which flank the foaming zone. The speed of such disks must be regulated with a high degree of precision which involves the use of skilled labor and complicated driving, adjusting and detecting mechanisms.

SUMMARY OF THE INVENTION

An object of the present invention is to provide a novel and improved method of producing slabs which consist of foamed synthetic plastic material and are provided with flat or substantially flat top surfaces.

Another object of the invention is to provide a method which can be practiced by resorting to a relatively simple, compact and inexpensive apparatus.

The improved method comprises the steps of feeding free-rising foam into an elongated path which confines the foam from below and at two sides so that the thus admitted foam forms a mass of substantially U-shaped cross section, and advancing the mass lengthwise through a foaming zone wherein the material of the mass foams (i.e., the bottom layer rises upwardly and the lateral layers rise horizontally toward each other) and is converted into a slab. In accordance with a presently preferred embodiment of the method, the free-rising foam is fed into the path in the form of several discrete streams, for example, in the form of three streams one of which is confined from below by a bottom liner of release paper or the like and the other two of which are confined at the outer sides thereof, preferably by lateral liners of release paper.

The weight per unit volume of free-rising foam in the one stream preferably exceeds the weight per unit volume of foam in the other two streams. The three streams can be admitted simultaneously or the one stream is admitted into the path at a point which is located upstream or downstream of the points of admission of the other two streams. The points of admission of the other two streams can be located at, below, or above the level of the top surface of the slab.

The novel features which are considered as characteristic of the invention are set forth in particular in the appended claims. The apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
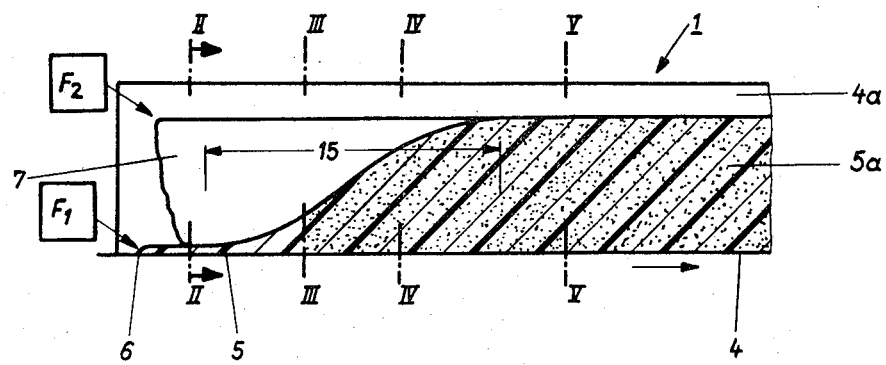
FIG. 1 is a fragmentary schematic longitudinal vertical sectional view of an apparatus which can be utilized in the practice of my method.
Figure 2:
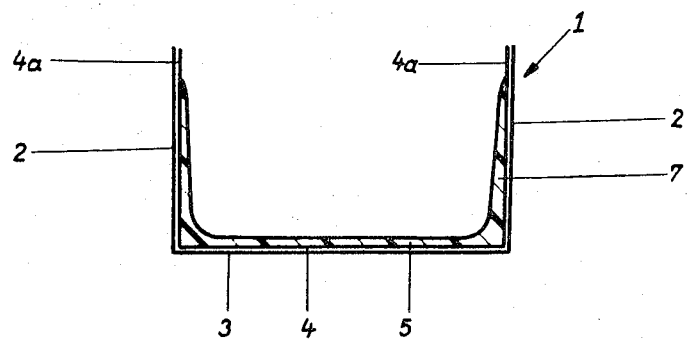
FIG. 2 is a transverse vertical sectional view as seen in the direction of arrows from the line II—II of FIG. 1.
Figure 5:
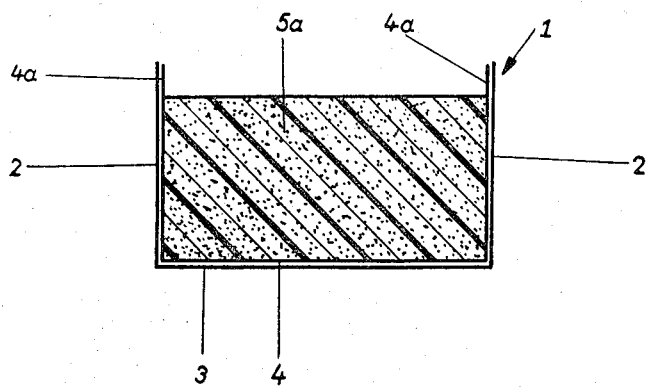
FIG. 5 is a similar sectional view taken on the line V—V of FIG. 1.

FIGS. 1 and 2 illustrate a portion of a conveyor 1 which comprises a bottom wall 3, for example, the upper stretch of an endless belt which advances in the direction indicated by arrow, and two stationary side walls 2 which extend upwardly from the edges of the travelling bottom wall 3. These walls define an elongated path which is located within the confines of a composite liner of release paper including a bottom liner 4 which overlies the bottom wall 3 and two lateral liners 4a overlying those sides of the walls 2 which face each other. The apparatus further comprises a composite feed including a first feed F1 which admits a first stream of free-rising foam at a point 6 whereby such stream forms a flat loaf 5 which extends between the side walls 2 and advances with the bottom liner 4 lengthwise through an elongated foaming zone 15 to be converted into a portion of a slab 5a of rectangular cross-sectional outline (FIGS. 1 and 5). The feed F1 may comprise a source of free-rising foam and a customary traversing head which moves back and forth transversely across the bottom liner 4 in the region indicated at 6.

The composite feed further includes two additional feeds F2 (one shown in FIG. 1) each of which admits an additional stream of free-rising foam to form two loaves 7 which advance with the lateral liners 4a through the foaming zone 15 and rise toward each other to form the remaining portions of the slab 5a. In the illustrated embodiment, the points where the feeds F2 admit additional streams of free-rising foam are located slightly downstream of the point 6, as considered in the direction in which the U-shaped mass including the loaves 5 and 7 advances through the foaming zone 15. However, it is equally possible to place the points of admission of additional streams in vertical alignment with the point 6 or upstream of such point. The level at which the feeds F2 admit additional streams of free-rising foam is shown as coinciding with the level of the top surface of the slab 5a. If desired or necessary, these points can be located above or below the level of such top surface.

Each of the two feeds F2 may comprise a single outlet or a series of outlets for discharge of free-rising foam which can be located above each other and/or one behind the other. The feeds F2 may comprise a common source of free-rising foam, for example, a customary mixer. The means for supplying free-rising foam from such single source into the path defined by the liners 4, 4a to form the lateral loaves 7 may include pipes with circular, oval or polygonal cross-sectional outline. It is important to employ piping which insures uniform admission of free-rising foam to both lateral liners 4a.

In order to avoid densification of foamed material in the marginal portions of the slab 5a, i.e., along the vertical sides of the slab, the weight per unit volume of the material admitted by the feeds F2 is preferably less than the weight per unit volume of the material issuing from the feed F1. This can be achieved by adding larger quantities of blowing agent to the material which is discharged by the feeds F2.

An important advantage of feeds F2 is that they insure coating of lateral liners 4a with free-rising foam before the loaf 5 rises along the inner sides of the walls 2. This prevents adhesion of the loaf 5 to the lateral liners 4a, i.e., the material of the loaf 5 can rise at the same rate all the way across its section to insure the formation of a slab 5a having a flat top. The resistance which the material of the rising loaf 5 must overcome in the foaming zone 15 is considerably less than if such loaf would have to rise along the liners 4a.

Figure 3:
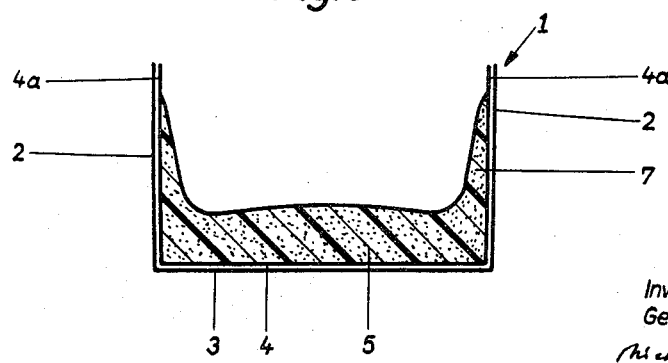
FIG. 3 is a transverse vertical sectional view taken on the line III—III of FIG. 1.
Figure 4:
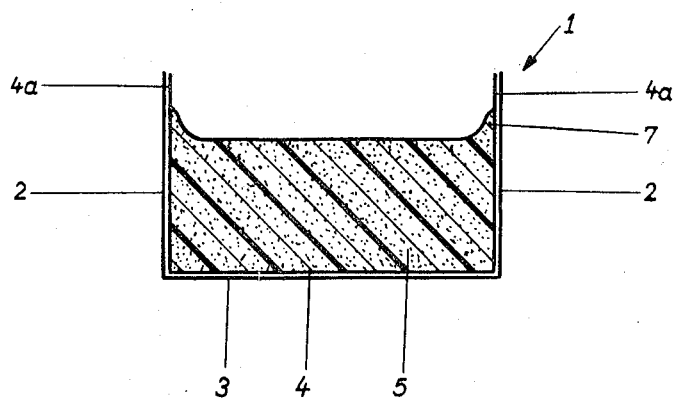
FIG. 4 is a similar sectional view on the line IV—IV of FIG. 1.

FIG. 2 illustrates the condition of the U-shaped mass formed by the streams discharged from the outlets of feeds F1 and F2 immediately downstream of the point 6. FIGS. 3 and 4 illustrate the manner in which the U-shaped mass foams during travel through the foaming zone 15, and FIG. 5 illustrates the slab 5a.

The exact position of the points of admission of additional streams from the feeds F2 with reference to the point 6 depends on the composition of free-rising foam. The same applies for the levels at which the feeds F2 admit free-rising foam into the path defined by the walls 2, 3 and liners 4, 4a.

It will be seen that, by the simple expedient of employing two or more feeds, the apparatus shown in FIGS. 1 to 5 is capable of producing a flat-top slab, i.e., a slab which does not exhibit a pronounced ridge or crest and which is therefore formed with a flat (rather than with a concave or convex) top surface.

What is claimed as new and desired to be protected by Letters Patent is set forth in the appended claims:

1. A method of producing foamed slabs of substantially rectangular cross-sectional outline comprising the steps feeding a foamable mass of polyurethane against the bottom and two sides of an elongated path which confines the mass only at the bottom and at the sides thereof so that the thus-admitted mass forms a body of substantially U-shaped cross-section; and advancing the mass lengthwise through a foaming zone wherein the material of the mass foams and is converted into a slab of substantially rectangular cross-section.

2. A method as defined in claim 1, wherein said foamable polyurethane mass is fed in three streams into said elongated path, one of which is directed against the bottom of said path and the other two against the sides thereof.

3. A method as defined in claim 2, wherein said streams of foamable polyurethane mass are confined at the bottom and at the two sides of said path by flexible liners which advance with the mass.

4. A method as defined in claim 2, wherein the weight per unit volume of the mass of foamable polyurethane which forms said one stream exceeds the weight per unit volume of the mass of foamable polyurethane which forms the other two streams.

5. A method as defined in claim 2, wherein said streams are admitted simultaneously into said path.

6. A method as defined in claim 2, wherein said one stream is admitted at a point located upstream of the points of admission of said other streams, as considered in the direction of travel of said mass.

7. A method as defined in claim 2, wherein said one stream is admitted into said path at a point located downstream of the points of admission of said other streams, as considered in the direction of advance of said mass.

8. A method as defined in claim 2, wherein said other streams are admitted into said path substantially at the level of the top surface of said slab.

9. A method as defined in claim 2, wherein said other streams are admitted into said path at a level which is different from the level of the top surface of said slab.

References Cited

UNITED STATES PATENTS

| 3,174,887 | 3/1965 | Voelker | 264—47 X |
| 3,325,573 | 6/1967 | Boon et al. | 264—54 |
| 3,429,085 | 2/1969 | Stillman | 264—45 X |
| 3,476,845 | 4/1969 | Buff et al. | 264—54 |
| 3,020,587 | 2/1962 | Alderfer et al. | 264—47 X |
| 3,068,136 | 12/1962 | Reid | 264—47 X |
| 3,079,641 | 3/1963 | Knox et al. | 264—54 |
| 3,325,823 | 6/1967 | Boon | 264—54 X |
| 3,383,257 | 5/1968 | James | 264—47 UX |
| 3,429,956 | 2/1969 | Porter | 264—47 |

FOREIGN PATENTS

| 840,398 | 7/1960 | Great Britain | 264—45 |
| 957,669 | 5/1964 | Great Britain | 264—45 |
| 999,515 | 7/1965 | Great Britain | 264—45 |

PHILIP E. ANDERSON, Primary Examiner

U.S. Cl. X.R.

18—4 B; 264—55, 213